United States Patent
Balmer et al.

(10) Patent No.: US 7,262,229 B2
(45) Date of Patent: Aug. 28, 2007

(54) INK FOR EXCIMER CURING

(75) Inventors: Rodney P. Balmer, Ann Arbor, MI (US); Michael Hazell, Ypsilanti, MI (US); Thomas R. Mawby, Ypsilanti, MI (US)

(73) Assignee: Flint Group, Plymouth, MI (US)

( * ) Notice: Subject to any disclaimer, the term of this patent is extended or adjusted under 35 U.S.C. 154(b) by 373 days.

(21) Appl. No.: 10/837,999

(22) Filed: May 3, 2004

(65) Prior Publication Data

US 2005/0245632 A1 Nov. 3, 2005

(51) Int. Cl.
*C08F 2/50* (2006.01)
*B41F 7/00* (2006.01)
*C09D 11/10* (2006.01)

(52) U.S. Cl. .......................... 522/182; 522/90; 522/96; 522/104; 522/107; 522/100; 522/103; 522/71; 522/73; 522/74; 522/80; 101/130; 523/160; 106/31.13; 106/31.27; 106/31.28; 106/31.6; 106/31.9

(58) Field of Classification Search ............... 522/181, 522/104, 100, 96, 90, 71, 73, 80, 178, 182, 522/103; 101/130; 523/160; 106/31.1, 106/31.13, 31.27, 31.28, 31.6, 31.9
See application file for complete search history.

(56) References Cited

U.S. PATENT DOCUMENTS

| | | | | |
|---|---|---|---|---|
| 5,354,367 A | * | 10/1994 | Pennaz | 522/157 |
| 5,382,282 A | * | 1/1995 | Pennaz | 106/31.74 |
| 5,629,356 A | | 5/1997 | Desobry et al. | |
| 6,025,409 A | | 2/2000 | Jansen | |
| 6,265,458 B1 | | 7/2001 | Nohr et al. | |
| 6,486,227 B2 | | 11/2002 | Nohr et al. | |
| 2002/0099111 A1 | | 7/2002 | Nohr et al. | |
| 2004/0235979 A1 | * | 11/2004 | Miezeiwski et al. | 522/100 |
| 2005/0051043 A1 | * | 3/2005 | Hojjati | 101/451 |

* cited by examiner

*Primary Examiner*—Sanza L. McClendon
(74) *Attorney, Agent, or Firm*—Harness, Dickey & Pierce, P.L.C.

(57) ABSTRACT

A lithographic ink composition that comprises a colorant having absorbency wavelength cutoffs of about 300 nm or longer, acrylate-functional materials, and a photoinitiator that absorbs at a wavelength of 300 nm or longer is formulated with a mileage of from about 1.1 to about 1.3 grams per square meter or to reach a desired print density at 2 microns or less print layer thickness. The lithographic ink cures faster and can be printed at a faster rate, particularly when curing is to be done with an excimer light source.

9 Claims, No Drawings

INK FOR EXCIMER CURING

FIELD OF THE INVENTION

The invention relates to inks curing by actinic radiation and printing methods, particularly for printing plastic substrates.

BACKGROUND OF THE INVENTION

Excimers are unstable, excited-state molecular complexes that occur only under extreme conditions, such as those temporarily existing in special types of gas discharge. Excimer complexes dissociate in less than a microsecond, releasing their binding energy in the form of ultraviolet radiation. The advantage of the excimer radiation as a light source for UV curing of compositions is that it provides radiation in a narrow band that can be matched to the absorbing radiation of a photoinitiator in the curing composition. In contrast, the mercury vapor lamps that often used for UV curing lithographic inks emit a broad band of ultraviolet, visible, and infrared radiation. Broadband radiation sources are problematic for plastic substrates because they tend to cause film deformation by heating the substrate.

Because excimer radiation delivers a narrow band of radiation, it is especially critical for the UV curing composition to be able to absorb a sufficient amount of energy at that wavelength to provide adequate cure. Nohr et al. in U.S. Pat. No. 6,265,458 describe photoinitiator selection for excimer curing. The pigment in inks interferes with light transmission, however, so that it is not only a matter of selecting an appropriate photoinitiator. It is generally thought that thinner films result in higher oxygen inhibition and a resultant decrease in the rate of cure, especially for dark colors.

To date, dark lithographic inks have been unable to provide print films sufficiently cured by excimer lamp and having the scratch resistance, overprintability, and adhesion to plastic substrates required of a commercially viable product, even though excimer lamps present a more energy efficient source of actinic radiation.

SUMMARY OF THE INVENTION

The present invention provides dark inks that may be printed lithographically and cured by a monochromatic excimer lamp. Dark colors are colors that have absorbency wavelength cutoffs of about 300 nm or longer. For example, the SWOP standard colors cyan, which has an absorbency cut off at 450 nm, and black, which has an absorbency cut off at 450+ nm, are dark colors.

In one embodiment, a lithographic ink composition according to the invention includes a colorant having absorbency wavelength cutoffs of about 300 nm or longer, acrylate-functional materials, and a photoinitiator that absorbs at a wavelength of 300 nm or longer, the ink composition having a mileage of from about 1.1 to about 1.3 grams per square meter. Preferably, the ink is formulated so that it may be printed and cured at a rate of at least about 15,000 sheets per hour.

In a further embodiment, a black lithographic ink composition of the invention includes colorant to provide the desired print density at 2 microns or less print film thickness, especially from about 1 to about 2 microns print film thickness. I In one preferred embodiment, the black lithographic ink includes from about 18 to about 22 percent by weight of a carbon black pigment and up to about 4% by weight of a toner of a desired color.

The invention also includes a set of different colored inks for process printing, including one or more dark inks of the invention. In a preferred embodiment, the process color set of inks includes black, cyan, magenta, and yellow inks, in which the black and/or cyan inks are inks of the invention.

In another embodiment, the dark inks of the invention are printed onto nonporous substrates such as thin plastic sheets and cured using actinic light without causing unacceptable deformation, preferably of the plastic sheets. In a preferred embodiment, the actinic light is an excimer light, especially one tuned to a wavelength between about 300 and 315 nm.

The invention further provides a method of printing on a plastic substrate, in which an ink of the invention is applied to the substrate by lithography and cured using an excimer light source. In one preferred embodiment, the excimer light source is tuned to about 308 nm.

The invention further provides a method of printing on a plastic substrate, in which a white ink or coating is applied as a first layer to a plastic substrate and a dark ink of the invention is applied over the white layer, both inks being applied by lithography and both inks being cured using an excimer light source. In one preferred embodiment, the excimer light source is tuned to about 308 nm.

The invention further provides a method of printing on a plastic substrate, in which a white ink or coating is applied to the reverse side of a clear plastic substrate and a dark ink of the invention is applied to the obverse side of the plastic substrate in an area over the white layer, both inks being applied by lithography and both inks being cured using an excimer light source. In one preferred embodiment, the excimer light source is tuned to about 308 nm.

A further method includes a step of printing a black lithographic ink composition curable by actinic radiation at from about 1 to about 2 mils film thickness, wherein the ink includes colorant to provide the desired print strength at the selected print thickness. The printed ink is then cured using an excimer light source. In a preferred embodiment, the black lithographic ink that is printed includes from about 18 to about 22 percent by weight of carbon black pigment and up to about 4% by weight of a toner.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

DETAILED DESCRIPTION OF THE PREFERRED EMBODIMENTS

The following description of the preferred embodiment(s) is merely exemplary in nature and is in no way intended to limit the invention, its application, or uses.

A lithographic ink composition according to the invention has a dark color, i.e., includes a colorant having absorbency wavelength cutoffs of about 300 nm or longer. Black and cyan are particularly important dark colors because, along with magenta and yellow, they form the standard process color set for full color printing. Other dark colors may be used in lithographic printing, also, either as spot colors or as part of an augmented set of color process lithographic inks (e.g., having 5, 6, or 7 ink colors for use in full color printing). For purposes of this invention, a dark color is one that has absorbency wavelength cutoffs of about 300 nm or longer. Absorbency in this range competes with the photoinitiator for energy absorbance from the UV light source. This problem is particularly acute in the case of an excimer lamp tuned to a wavelength where the colorant absorbs. Examples of dark colorants include, without limitation, carbon black pigment, alkali blue, pigment blue 61, pigment violets 23, 1, and 3, pigment blue 1, pigment green 7, and so on.

The ink is formulated to provide a standard density with a mileage of at least about 1.1, preferably at least about 1.15, more preferably at least about 1.18 grams per square meter. The ink is formulated to provide a standard density with a mileage of up to about 1.3, preferably up to about 1.25, more preferably up to about 1.22 grams per square meter. The ink is formulated to provide a standard density with a mileage of from about 1.1 to about 1.3 grams per square meter, preferably from about 1.15 to about 1.25 grams per square meter, more preferably form about 1.18 to about 1.22 grams per square meter. Print density is specified by industry standards such as SWOP densities. In one embodiment, the ink is black and has a print density from about 1.55 to about 1.65.

In general, the ink of the invention includes a sufficient amount of colorant to provide standard density at the specified mileage. In particular, a black ink of the invention preferably includes from about 18 to about 22 percent by weight of a carbon black pigment and up to about 4% by weight of a toner of a desired color.

Alternatively, the ink of the invention may be formulated to have a desired print density at 2 microns or less print thickness. The lower limit of print thickness depends upon the particular color of the ink.

The UV-curing lithographic inks of the invention also include acrylate-functional materials. The ink may include acrylate monomer and/or oligomers. Preferably, the include includes at least acrylate oligomers, and is formulated to have a suitable viscosity for lithographic printing. In general, acrylate materials are preferred over methacrylate or vinyl materials because the acrylate materials have faster cure rates. "Acrylate" is used herein, however, to include any ethylenically unsaturated, photocurable materials.

Monomers may be monoethylenically functional or polyethylenically functional, and preferably difunctional, trifunctional, and/or tetrafunctional monomers are included. Suitable examples of acrylate monomers include, without limitation, Suitable examples of acrylate monomers include, without limitation, NPGDA, TRPGDA, TMPTA, HODDA, GPTA, IBOA, EOEOEA, and so on.

Suitable examples of acrylate oligomers include, without limitation, polyester acrylates, epoxy acrylates, and urethane acrylates. Such oligomers are well-known and described in detail in many references. Many are commercially available. In general, acrylate-functional oligomers may be formed by preparing an oligomeric material having one or more functional groups reactive with an acrylate monomer, such as with acrylic acid.

The lithographic ink may contain further ethylenically unsaturated reactants, such as methacrylate monomers and oligomers and vinyl monomers and oligomers. If included, these further materials are generally used in small amounts due their lower reactivity.

Examples of suitable photoinitiators include, without limitation, 2-dimethylamino-2-(4-methylbenzyl)-4'-morpholinobutyrophenone, 4-benzoyl-4'-methyldiphenyl sulfide, ethyl-4-(dimethylamino)benzoate, α-aminoalkylphenones such as 2-methyl-1,4-(methylthiophenyl)-2-morpoholino-propan-2-one and 2-benzyl-2-dimethylamino-1-(4-meorpolinophenyl)-butan-1-one, and aromatic phosphine oxides such as 2,4,6-trimethylbenzoyldiphenyl phosphine oxide and bis(2,4,6-trimethylbenzoyl)-phenyl phosphine oxide, as well as combinations of these. The photoinitiator or photoinitiators are included in amounts of from about 4 percent to about 20 percent by weight in the ink.

In one preferred embodiment, a dark lithographic ink composition has from about 4 to about 6 percent by weight 2-dimethylamino-2-(4-methylbenzyl)-4'-morpholinobutyrophenone and from about 7 to about 10 percent by weight 2-methyl-1-4-(methylthiophenyl)-2-morpholino-propan-2-one, which cures with good properties when exposed to an excimer light source tuned to 308 nm.

In another preferred embodiment, a cyan lithographic ink composition has from about 4 to about 6 percent by weight 4-benzoyl-4'-methyldiphenyl sulfide and from about 2 to about 4 percent by weight ethyl-4-(dimethylamino)benzoate, which cures with good properties when exposed to an excimer light source is tuned to about 308 nm.

It will be appreciated by the skilled artisan that other additives known in the art may be included in the lithographic ink compositions, so long as such additives do not significantly detract from the benefits of the present invention. Illustrative examples of other additives include, without limitation, surfactants, wetting agents, waxes, emulsifying agents and dispersing agents, antioxidants, flow agents and other rheology modifiers, gloss enhancers, and anti-settling agents. When included, additives are typically included in amounts of at least about 0.001% of the ink composition, and may be included in amount of about 7% by weight or more of the ink composition.

The inks of the invention are lithographically printed onto a substrate. Suitable substrates include, for examples, paper, board, recycled board, metallized substrates including metallized papers and foil-laminated substrates, and plastic substrates, both clear and opaque. Preferably, the inks are black and/or cyan and form a part of a process color set for full-color printing. The inks may also be other dark color formulated as spot colors or as members of an augmented process color set.

The applied ink is cured with actinic radiation, preferably with a UV light source. Various UV light sources, including iron oxide or thallium doped mercury mercury lamps and xenon chloride lamps, are available. The inks of the invention are particularly useful for curing with excimer light sources, which may be tuned to a single wavelength or vary narrow band of wavelengths of about 300 nm or longer. In one embodiment, the printed ink is cured using an excimer light source tuned to about 308 nm. Such an excimer light source is the Seccomatic Blue lamp, available from MAN-Roland. Excimer light sources are particularly beneficial for printing plastic substrates such as plastic sheets because the excimer light sources do not generate heat that deforms the plastic.

The lithographic inks of the invention may be printed and cured with an excimer lamp, such as the one tuned to about 308 nm, at a rate of at least about 15,000 sheets per hour, which represents a significant improvement over the rate at which other lithographic inks may be printed and cured by such an excimer lamp.

Plastic substrates, particularly clear, white substrates, may be printed or coated with a white, UV-curing ink or coating in addition to the ink of the invention. The white coating or ink may be applied as a first layer on the plastic over which the ink of the invention is printed, or may be applied to the other side of the plastic where the ink of the invention is printed. The UV-cure white ink or coating may be co-cured with the printed ink of the invention.

The invention is illustrated by the following example. The example is merely illustrative and does not in any way limit the scope of the invention as described and claimed. All parts are parts by weight unless otherwise noted. Example 1.

|  | Example 1 |
| --- | --- |
| Irgacure 907 | 7.2 |
| Irgacure 379 | 4.8 |
| Dispersant | 12.0 |
| Nonreactive additives | 20.5 |
| HDODA | 18 |
| oligomeric acrylates | 26 |
| carbon black | 20 |
| alkali blue | 4 |

The photoinitiators are dissolved in the dispersant, then the other materials are added and the mixture is milled to a desired fineness.

Images were lithographically printed on 20 mil PVC film sheets using the ink as the black ink of a four-color (CMYK) process color ink set. The black ink of this example had a SWOP print density of about 1.65 at a print thickness of about 2 microns. The printed images were cured using an excimer light source tuned to about 308 nm (the Seccomatic Blue lamp, available from MANRoland). The images were printed and cured at a rate of about 16,000 sheets per hour. The prints were fully cured and had excellent adhesion to the substrate and excellent abrasion and scratch resistance.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A lithographic ink composition comprising a colorant having absorbency wavelength cutoffs of about 300 nm or longer, acrylate-functional materials, and a photoinitiator that absorbs at a wavelength of 300 nm or longer, wherein said ink composition has a mileage of from about 1.1 to about 1.3 grams per square meter and wherein the ink may be printed and cured at a rate of at least about 15,000 sheets per hour.

2. A lithographic ink composition according to claim 1, wherein said ink composition cures when exposed to an excimer light source tuned to a wavelength of 300 nm or longer.

3. A lithographic ink composition according to claim 1, wherein said ink is cyan or black.

4. A lithographic ink composition according to claim 1, wherein said ink composition is black and has a mileage of from about 1.18 to about 1.22 grams per square meter for print having a density of from about 1.55 to about 1.65.

5. A lithographic ink according to claim 4, wherein said ink comprises from about 18 to about 22 percent by weight of a carbon black pigment and up to about 4% by weight of a toner of a desired color.

6. A lithographic ink composition according to claim 1, wherein said ink composition has a mileage of from about 1.15 to about 1.25 grams per square meter.

7. A lithographic ink composition comprising a colorant having absorbency wavelength cutoffs of about 300 nm or longer, acrylate-functional materials, and a photoinitiator that absorbs at a wavelength of 300 nm or longer, wherein said ink composition has a desired print density at 2 microns or less print thickness and wherein the ink may be printed and cured at a rate of at least about 15,000 sheets per hour.

8. A set of process color inks, comprising at least one ink according to claim 1.

9. A set of process color inks, comprising at least one ink according to claim 7.

* * * * *